(12) United States Patent
Okawachi et al.

(10) Patent No.: US 9,249,935 B2
(45) Date of Patent: Feb. 2, 2016

(54) FUEL SUPPLY SYSTEM

(75) Inventors: Eiji Okawachi, Toyota (JP); Kazushi Numazaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 311 days.

(21) Appl. No.: 13/880,215

(22) PCT Filed: Oct. 17, 2011

(86) PCT No.: PCT/IB2011/002459
§ 371 (c)(1),
(2), (4) Date: Apr. 18, 2013

(87) PCT Pub. No.: WO2012/056280
PCT Pub. Date: May 3, 2012

(65) Prior Publication Data
US 2013/0206257 A1    Aug. 15, 2013

(30) Foreign Application Priority Data
Oct. 28, 2010   (JP) .................................. 2010-241755

(51) Int. Cl.
*F17D 1/00*   (2006.01)
*F16K 31/06*  (2006.01)
(Continued)

(52) U.S. Cl.
CPC .............. *F17D 1/00* (2013.01); *F16K 31/0655* (2013.01); *F17C 7/00* (2013.01); *H01M 8/04089* (2013.01); *H01M 8/04201* (2013.01); *H01M 8/04373* (2013.01); *H01M 8/04388* (2013.01);
(Continued)

(58) Field of Classification Search
None
See application file for complete search history.

(56) References Cited

U.S. PATENT DOCUMENTS 5,899,194 A  *  5/1999  Iwatsuki et al. .............. 123/527
6,584,998 B1     7/2003  Milner
(Continued)

FOREIGN PATENT DOCUMENTS

DE   10 2008 019 466   3/2010
JP   2002-181295       6/2002
(Continued)

OTHER PUBLICATIONS

Written Opinion of the International Searching Authority in International Application No. PCT/IB2011/002459; Mailing Date: Feb. 21, 2012.
(Continued)

*Primary Examiner* — Carlos Barcena
*Assistant Examiner* — Wojciech Haske
(74) *Attorney, Agent, or Firm* — Finnegan, Henderson, Farabow, Garrett & Dunner, LLP

(57) ABSTRACT

A fuel supply system includes a fuel gas tank; a temperature detecting portion; a fuel gas discharge flow path; a main stop valve that is provided in the fuel gas discharge flow path; and a control portion. The main stop valve includes an inlet portion and an outlet portion, a main valve that is arranged between the inlet portion and the outlet portion and that opens and closes the fuel gas discharge flow path, a pilot flow path that is provided so as to communicate the inlet portion with the outlet portion, a pilot valve that opens and closes the pilot flow path, and an actuator capable of opening and closing the main valve and the pilot valve at different timings. The control portion opens the pilot valve and closes the main valve when the detected temperature is equal to or lower than a first reference temperature.

10 Claims, 6 Drawing Sheets

(51) Int. Cl.
*F17C 7/00* (2006.01)
*H01M 8/04* (2006.01)

(52) U.S. Cl.
CPC ............ *H01M8/04753* (2013.01); *Y02E 60/50* (2013.01); *Y10T 137/8158* (2015.04)

(56) References Cited

U.S. PATENT DOCUMENTS

2006/0246177 A1* 11/2006 Miki et al. ............... 426/24
2009/0095363 A1* 4/2009 Nakakubo et al. ........... 137/843

FOREIGN PATENT DOCUMENTS

JP 2006-147346 6/2006
JP 2009-168166 7/2009

OTHER PUBLICATIONS

Applicant's Response to the Written Opinion of the International Searching Authority in International Application No. PCT/IB2011/002459 (May 24, 2012).

International Preliminary Report on Patentability in International Application No. PCT/IB2011/002459; Completion Date: Jan. 24, 2013.

* cited by examiner

FUEL SUPPLY SYSTEM

CROSS-REFERENCE TO RELATED APPLICATIONS

This application is a national phase application of International Application No. PCT/IB2011/002459, filed Oct. 17, 2011, and claims the priority of Japanese Application No. 2010-241755, filed Oct. 28, 2010, the content of both of which is incorporated herein by reference.

BACKGROUND OF THE INVENTION

1. Field of the Invention

The invention relates to a fuel supply system.

2. Description of Related Art

A structure is known that uses a hydrogen tank filled with compressed hydrogen to supply hydrogen gas to a fuel cell that generates energy using hydrogen gas as a fuel gas. When fuel gas is removed from this kind of a high pressure gas tank, fuel gas adiabatically expands in the tank, causing the temperature inside the tank to drop. If the temperature of the fuel gas removed from the tank is too low, it is necessary to take low temperature countermeasures at members that are arranged downstream of the tank, for example. One such measure to inhibit such a drop in the temperature inside the tank is described in Japanese Patent Application Publication No. 2002-181295 (JP-A-2002-181295), that describes a structure that makes the temperature uniform by arranging a heat-transfer member inside the tank.

However, the drop in temperature of the fuel gas due to the fuel gas adiabatically expanding inside the tank quickly progresses near the tank inside wall when fuel gas is removed from the tank. Therefore, even if a heat-transfer member is arranged inside the tank, there may be times when it is not possible to sufficiently suppress a drop in temperature of the fuel gas that is removed from the tank. Also, a structure in which a heat-transfer member is arranged inside the tank may difficult to employ because it makes the tank structure complex, reduces the amount of gas that can be filled, or increases in the tank weight.

SUMMARY OF THE INVENTION

The invention therefore provides a fuel supply system that includes a tank in which fuel gas is stored at high pressure, and that is able to suppress a decrease in the temperature of fuel gas removed from the tank while inhibiting the tank structure from becoming complex.

A first aspect of the invention relates to a fuel supply system that supplies fuel gas. This fuel supply system includes a fuel gas tank in which the fuel gas is stored at high pressure; a temperature detecting portion that detects a temperature inside the fuel gas tank; a fuel gas discharge flow path that is connected to the fuel gas tank; a main stop valve that is provided in the fuel gas discharge flow path; and a control portion that controls opening and closing of the main stop valve. The main stop valve includes an inlet portion through which the fuel gas flows in and an outlet portion through which the fuel gas flows out, a main valve that is arranged between the inlet portion and the outlet portion and that opens and closes the fuel gas discharge flow path, a pilot flow path that is provided so as to communicate the inlet portion with the outlet portion, a pilot valve that opens and closes the pilot flow path, and an actuator capable of opening and closing the main valve and the pilot valve at different timings. The control portion opens the pilot valve and closes the main valve when a detected temperature detected by the temperature detecting portion is equal to or lower than a first reference temperature.

According to this fuel supply system, when the temperature of the fuel gas inside the fuel gas tank is equal to or lower than the reference temperature, control to open only the pilot valve while the main valve is closed is performed, thereby suppressing the amount of fuel gas discharged from the fuel gas tank, which makes it possible to inhibit the temperature of the fuel gas inside the fuel gas tank from dropping further. Also, because the amount of low temperature fuel gas that is discharged from the fuel gas tank can be suppressed, it is possible to suppress the temperature of a member that is arranged downstream of the fuel gas tank from becoming too low. Moreover, a main stop valve is used, which makes it possible to inhibit the system from becoming more complex.

In the fuel supply system described above, the control portion may repeatedly open and close the pilot valve and close the main valve when the detected temperature detected by the temperature detecting portion is equal to or lower than the first reference temperature. According to this fuel supply system, repeatedly opening and closing the pilot valve and closing the main valve makes it possible to suppress the amount of fuel gas discharged from the fuel gas tank.

The control portion may open the main valve when the detected temperature is equal to or higher than a second reference temperature that is higher than the first reference temperature.

In the fuel supply system described above, the pilot valve may open and close the pilot flow path that is provided inside the main valve. According to this fuel supply system, the amount of fuel gas discharged from the fuel gas tank is able to be suppressed using a compact main stop valve in which a pilot flow path that is opened and closed by a pilot valve is provided inside the main valve.

In the fuel supply system described above, the actuator may drive the pilot valve, and drive the main valve via the pilot valve. According to this fuel supply system, the amount of fuel gas discharged from the fuel gas tank is able to be suppressed using a compact main valve that uses a common actuator to open and close the main valve and the pilot valve.

In the fuel supply system described above, the actuator may be an electromagnet. According to this fuel supply system, the amount of fuel gas discharged from the fuel gas tank is able to be suppressed by controlling the flow of current to the electromagnet.

In the fuel supply system described above, the reference temperature may be a temperature set based on a cold resistance temperature of a member arranged downstream of the main stop valve in the fuel gas discharge flow path. According to this fuel supply system, problems in a member arranged downstream of the main stop valve due to low temperature fuel gas being supplied are able to be suppressed.

A second aspect of the invention relates to a fuel cell system having a fuel cell. This fuel cell system is provided with the fuel supply system according to the first aspect of the invention. The fuel gas is hydrogen gas, and the fuel cell generates electric power using hydrogen gas supplied from the fuel supply system.

A third aspect of the invention relates to a control method for a fuel supply system that supplies fuel gas. The fuel supply system includes a fuel gas tank in which the fuel gas is stored, a fuel gas discharge flow path that is connected to the fuel gas tank, and a main stop valve that is provided in the fuel gas discharge flow path. The main stop valve includes an inlet portion through which the fuel gas flows in and an outlet portion through which the fuel gas flows out, a main valve that is arranged between the inlet portion and the outlet portion and that opens and closes the fuel gas discharge flow path, a pilot flow path that is provided so as to communicate the inlet portion with the outlet portion, and a pilot valve that opens and closes the pilot flow path. The control method of the fuel supply system includes detecting a temperature inside the fuel gas tank and opening the pilot valve and closing the main valve when the temperature detected inside the fuel gas tank is equal to or lower than a first reference temperature.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A. Overall Structure of the System

Figure 1:
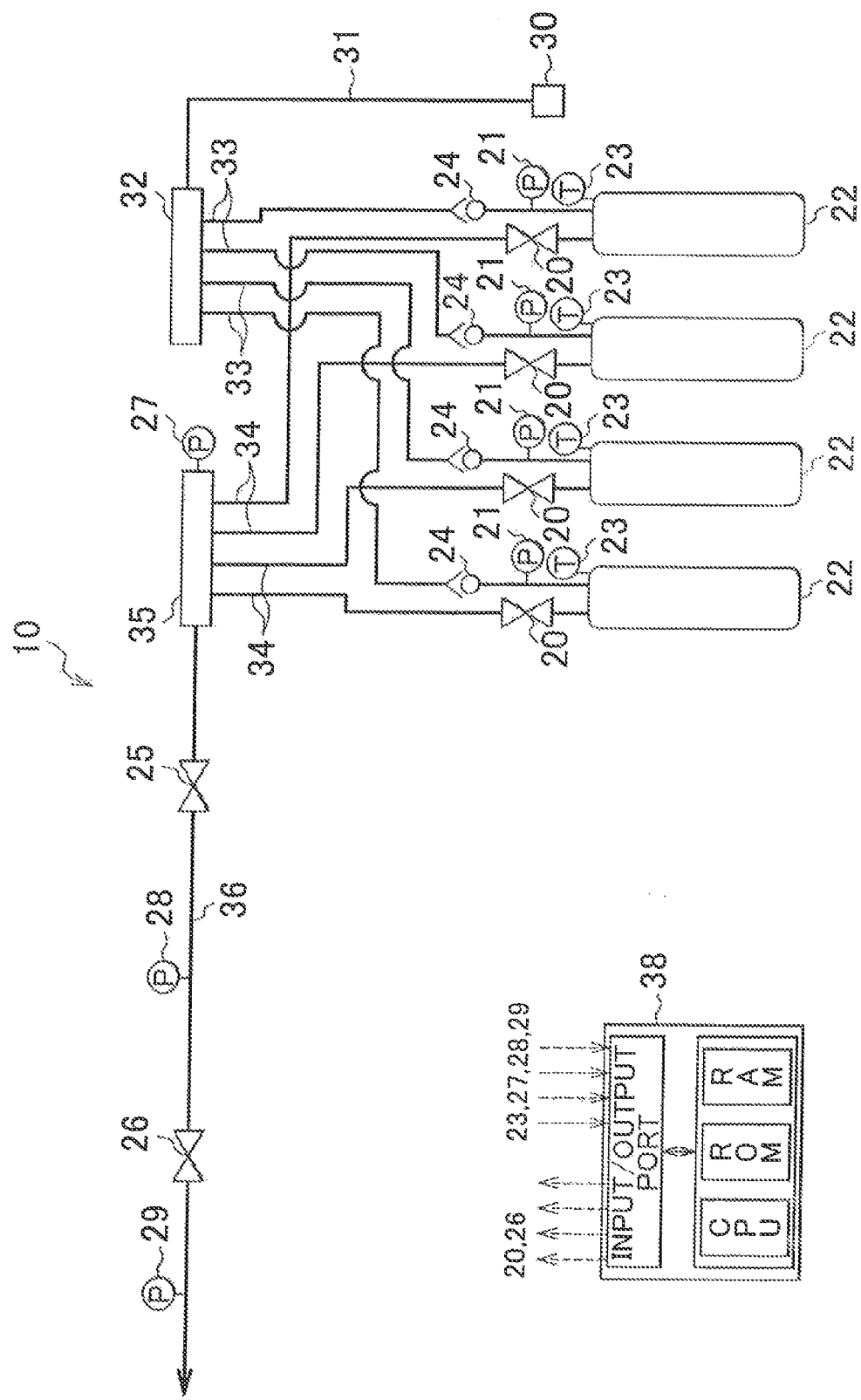
FIG. 1 is a block diagram of the general structure of a fuel supply system.

FIG. 1 is a block diagram of the general structure of a fuel supply system 10 that is one example embodiment of the invention. The fuel supply system 10 of this example embodiment is a system that is provided in an electric vehicle provided with a fuel cell as a power source for driving, and supplies hydrogen gas as fuel gas to the fuel cell. That is, the fuel supply system 10 of this example embodiment forms part of a fuel cell system provided in an electric vehicle.

The fuel supply system 10 includes a hydrogen tank 22 that stores hydrogen gas to be supplied to the fuel cell, a conduit for filling hydrogen gas into the hydrogen tank 22, a conduit that leads hydrogen gas discharged from the hydrogen tank 22 to the fuel cell, and a control portion 38. Although this example embodiment is characterized by control of a pilot type electromagnetic valve provided in the conduit that leads hydrogen gas discharged from the hydrogen tank 22 to the fuel cell, the overall structure of the fuel supply system 10 will first be described.

The fuel supply system 10 of this example embodiment is provided with four hydrogen tanks 22, as shown in FIG. 1. The number of hydrogen tanks 22 that the fuel supply system 10 has may be any number of one or more. Each hydrogen tank 22 is provided with a temperature sensor 23 for detecting the internal temperature of the hydrogen tank 22.

A first hydrogen filling flow path 31, a filling flow path converging portion 32, and second hydrogen filling flow paths 33 are all provided as conduits for filling hydrogen gas into the hydrogen tank 22. An opening portion provided at one end of the first hydrogen filling flow path 31 forms a filling port 30. This filling port 30 serves as an interface when refilling hydrogen gas into the electric vehicle from the outside.

The other end of the first hydrogen filling flow path 31 is connected to the filling flow path converging portion 32, and this filling flow path converging portion 32 is connected to four second hydrogen filling flow paths 33. Each second hydrogen filling flow path 33 is connected to a corresponding hydrogen tank 22. A check valve 24 is provided in each second hydrogen filling flow path 33. Providing this check valve 24 prevents hydrogen gas from flowing from the hydrogen tank 22 toward the filling port 30 side. Also, a first pressure sensor 21 is provided between the check valve 24 and the hydrogen tank 22, in each second hydrogen filling flow path 33. This first pressure sensor 21 is a sensor for detecting the hydrogen pressure inside the hydrogen tank 22. The first pressure sensor 21 may be attached to the hydrogen tank 22, or it may be provided upstream of a main stop valve 20, that will be described later, in a first hydrogen discharge flow path 34 that will also be described later.

The first hydrogen discharge flow path 34, a discharge flow path converging portion 35, and a second hydrogen discharge flow path 36 are provided as conduits that lead the hydrogen gas from inside the hydrogen tank 22 to the fuel cell. One first hydrogen discharge flow path 34 is provided for each of the four hydrogen tanks 22, with one end connected to the hydrogen tank 22 and the other end connected to the discharge flow path converging portion 35. The discharge flow path converging portion 35 is also connected to one end of the second hydrogen discharge flow path 36. The other end of the second hydrogen discharge flow path 36 is connected to a fuel cell, now shown.

Each first hydrogen discharge flow path 34 is provided with a main stop valve 20. The main stop valve 20 is a pilot type electromagnetic valve that includes a main valve and a pilot valve. The main stop valve 20 is open when supplying hydrogen gas to the fuel cell when generating power, and the main stop valve 20 is closed when stopping the supply of hydrogen gas to the fuel cell when stopping the generation of power.

The second hydrogen discharge flow path 36 is provided with a regulator 25 and an injector 26 in that order from the upstream side with respect to the flow of hydrogen. The regulator 25 is a pressure reduction valve that reduces a primary pressure of introduced hydrogen gas to a predetermined secondary pressure on the downstream side of the regulator 25. More specifically, the regulator 25 may be a diaphragm type pressure reduction valve.

The injector 26 has an electromagnetically driven on-off valve inside of it, and controls the amount of hydrogen supplied to the fuel cell by controlling the driving cycle and the valve-open time (i.e., the duty ratio) of the on-off valve. In this example embodiment, only one regulator 25 is provided, but a plurality of pressure reduction valves may also be provided in order to sufficiently reduce the hydrogen pressure ahead of the injector 26.

The discharge flow path converging portion 35 is provided with a second pressure sensor 27, such that the pressure of hydrogen gas discharged from the hydrogen tank 22 can be detected. Also, in the second hydrogen discharge flow path 36, a third pressure sensor 28 is provided between the regulator 25 and the injector 26, and a fourth pressure sensor 29 is provided downstream of the injector 26. Control of the drive cycle and the valve-open time described above of the injector 26 is performed based on detection signals of the third pressure sensor 28 and the fourth pressure sensor 29 that are detected as the hydrogen pressure upstream and downstream of the injector 26, respectively.

The control portion 38 is formed as a logic circuit centered around a microcomputer, and includes a CPU, ROM, RAM, and an input/output port that inputs and outputs various signals. The control portion 38 obtains detection signals from the temperature sensor 23 or the first to the fourth pressure sensors. Further, the control portion 38 outputs drive signals to the main stop valve 20 and the injector 26. The control portion 38 also obtains various information relating to the operating states of the fuel cell system that includes the fuel supply system 10, and the electric vehicle. The control portion 38 determines the operating states of the fuel cell system and the electric vehicle, as well as the amount of hydrogen to be supplied to the fuel cell, based on the information obtained in this way and outputs drive signals to the main stop valve 20 and the injector 26.

B. Basic Operation of the Pilot Type Electromagnetic Valve

The main stop valve 20 is a pilot type electromagnetic valve that includes a main valve and a pilot valve. The pilot type electromagnetic valve in this example embodiment opens and closes the pilot valve by an electromagnet that is an actuator, and opens the main valve with little power by reducing the differential pressure between the downstream fluid pressure and the upstream fluid pressure, which is accomplished by opening the pilot valve. Hereinafter, the basic operation relating to the opening and closing of the main stop valve 20 will be described.

Figure 2:
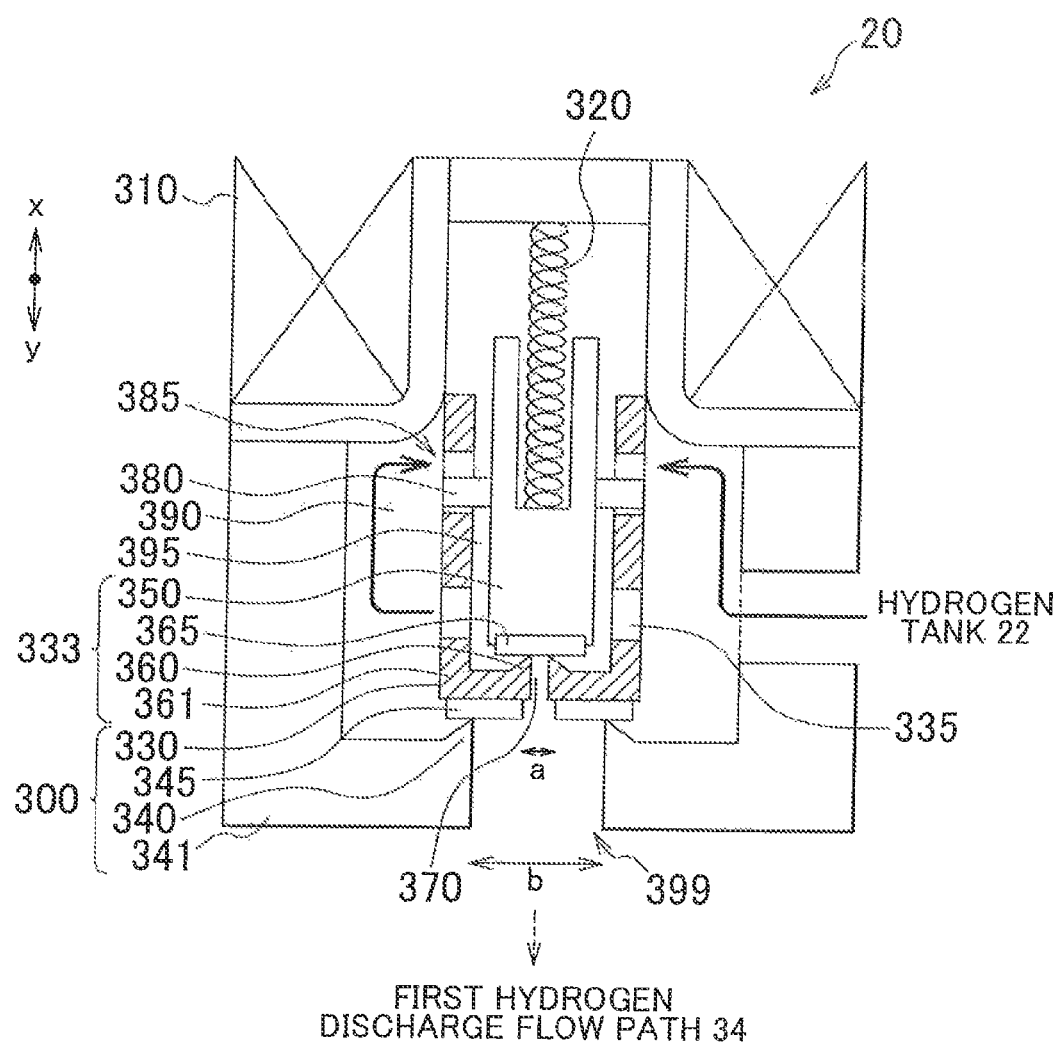
FIG. 2 is a view of an opening closing mechanism of a main stop valve.
Figure 3:
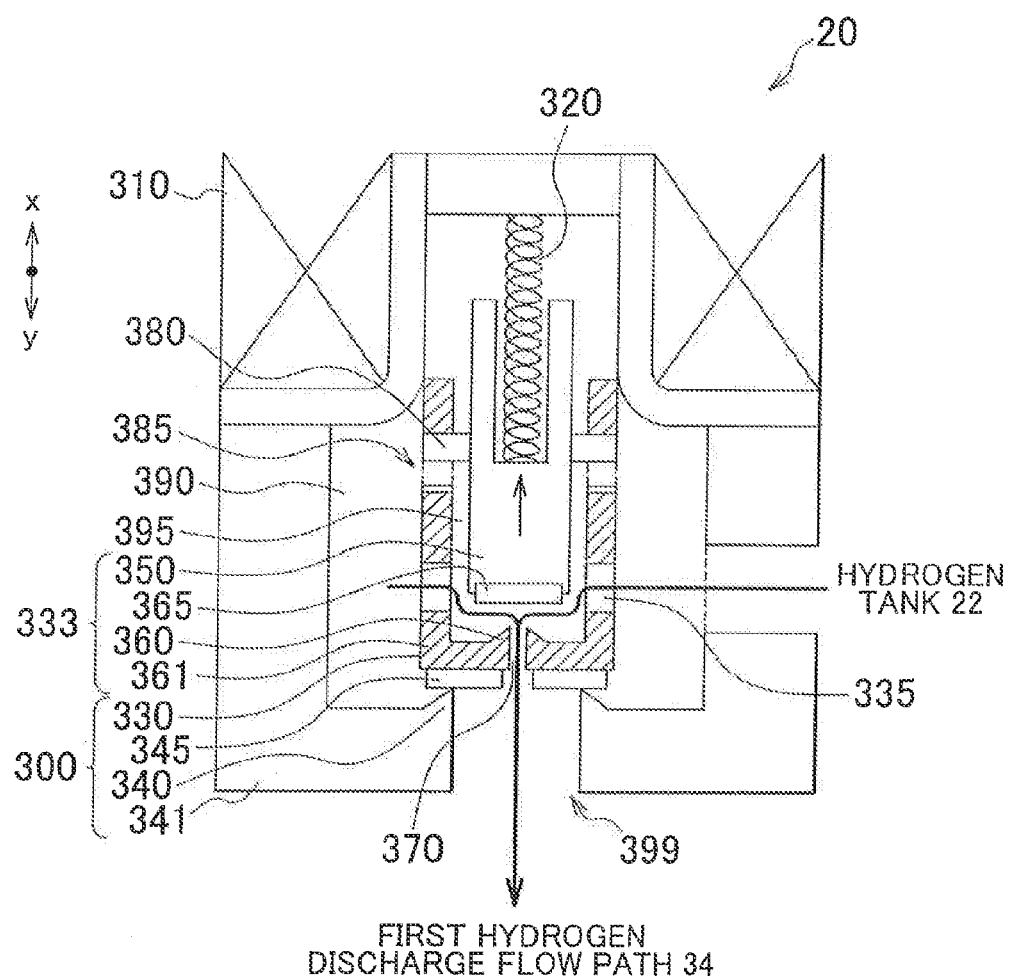
FIG. 3 is another view of the opening/closing mechanism of the main stop valve.
Figure 4:
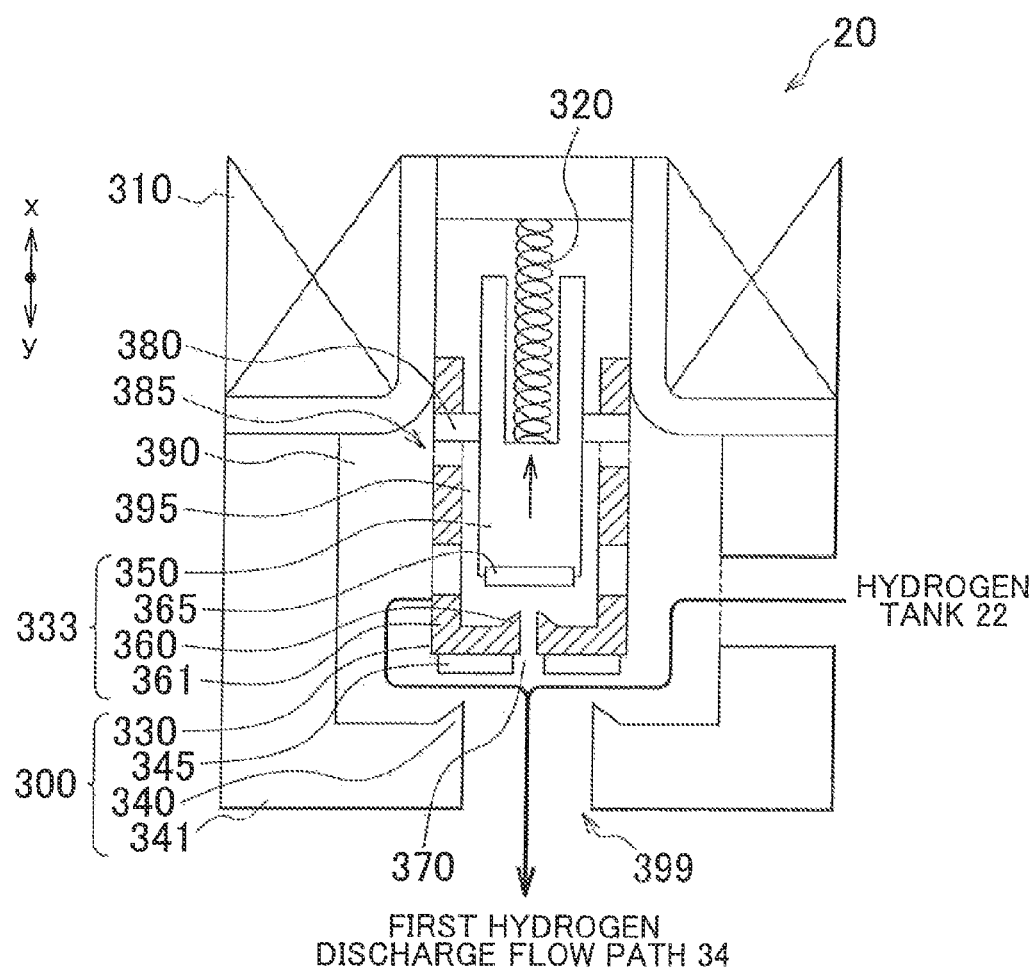
FIG. 4 is yet another view of the opening/closing mechanism of the main stop valve.

FIGS. 2, 3, and 4 are views of an opening/closing mechanism of the main stop valve 20. The main stop valve 20 mainly includes a coil 310, a main valve 300, and a pilot valve 333. The main valve 300 includes a main valve valve seat member 341 with a main valve valve seat 340, a main valve valve body 330, and a main valve seat portion 345 provided on the main valve valve body 330. The main valve valve body 330 is shown with hatching in FIGS. 2 to 4.

A main valve first hole 385, that will be described later, into which a pilot pin 380 is inserted, and a main valve second hole. 335 for enabling hydrogen to flow into the main valve valve body 330 are formed in the main valve valve body 330. The main valve 300 is closed by the main valve seat portion 345 sitting on the main valve valve seat 340, and is opened by the main valve seat portion 345 moving away from the main valve valve seat 340. In FIG. 2, the diameter of an opening portion 399 of the main valve 300 is shown as diameter b.

The pilot valve 333 is formed inside the main valve valve body 330, and includes a pilot valve valve seat member 361 with a pilot valve valve seat 360, a pilot valve valve body 350, a pilot valve seat portion 365 provided on the pilot valve valve body 350, and a return spring 320. The return spring 320 applies force Fs (hereinafter referred to as "return spring force Fs") to the pilot valve valve body 350 in a direction indicated as the y direction (the valve closing direction) in FIGS. 2 to 4. A pilot pin 380 that is inserted into the main valve first hole 385 that will be described later is provided on the pilot valve valve body 350. The pilot valve 333 is closed by the pilot valve seat portion 365 sitting on the pilot valve valve seat 360, and is opened by the pilot valve seat portion 365 moving away from the pilot valve valve seat 360. In FIG. 2, the diameter of an opening portion 370 of the pilot valve 333 is shown as diameter a.

When energized in response to a drive signal from the control portion 38, the coil 310 generates attraction force Fr that pulls the pilot valve valve body 350 in a direction indicated as the x direction (the valve opening direction) in FIGS. 2 to 4. The attraction force Fr is able to be controlled by adjusting the amount of current applied to the coil.

A main valve flow path 390 through which hydrogen gas flows in from the hydrogen tank 22 is formed between the main valve valve seat member 341 and the main valve valve body 330. Also, a pilot flow path 395 through which hydrogen gas flows in from the main valve flow path 390 via the main valve second hole 335 described above is formed between the pilot valve valve seat member 361 and the pilot valve valve body 350. A predetermined pressure loss may occur in the main valve flow path 390, but in this example embodiment, the pressure of the hydrogen gas in the main valve flow path 390 is regarded as a tank pressure value Pm that is the inlet pressure (primary pressure) of the main stop valve 20. Also, the output pressure (secondary pressure) of the main stop valve 20 is Pk.

FIG. 2 is a view of the main stop valve 20 when current is not flowing to the coil 310, i.e., when no attraction force Fr is being generated. In this case, in the pilot valve 333, return spring force Fs is applied as force in which the pilot valve valve body 350 pushes the pilot valve valve seat 360 in the y direction (i.e., the valve closing direction). Also, in the pilot valve 333, force generated by the pressure difference at the diameter a of the opening portion 370, i.e., force generated by the difference between the pressure Pm that is the primary pressure and the pressure Pk that is the secondary pressure, is applied. At this time, the tank pressure Pm is higher than the pressure Pk downstream, so the force generated by the pressure difference becomes force in the y direction. In this way, when de-energized, only force in the y direction acts on the pilot valve 333, so the pilot valve 333 is closed.

Similarly, in the main valve 300, the return spring force Fs and force generated by the pressure difference at the diameter b of the opening portion 399 (i.e., the difference between the primary pressure and the secondary pressure) are applied as force in the y direction (i.e., the valve closing direction). Therefore, the main valve 300 is also closed.

FIG. 3 is a view of the main stop valve 20 immediately after current has begun to flow to the coil 310. When current flows to the coil 310, the pilot valve valve body 350 is pulled by the attraction force Fr of the coil 310. As described above, in the pilot valve 333, the return spring force Fs and the force generated by the pressure difference at the diameter a of the opening portion 370 (i.e., the difference between the primary pressure and the secondary pressure) are applied as force in the y direction the valve closing direction). Therefore, the current flowing to the coil 310 creates a force as the attraction force Fr, i.e., force in the x direction (i.e., the valve opening direction), that is sufficiently larger than the force in the y direction, such that the pilot valve valve body 350 is pulled up in the x direction and the pilot valve 333 is opened. At this time, the pilot valve valve body 350 is pulled up in the x direction until the pilot pin 380 abuts against the inner wall surface of the main valve first hole 385.

When the pilot valve 333 opens in this way, hydrogen gas inside the hydrogen tank 22 is supplied to the secondary side (i.e., downstream of the first hydrogen discharge flow path 34) via the main valve flow path 390, the pilot flow path 395, and the opening portion 370. Then in the main stop valve 20, when hydrogen gas is supplied to the secondary side as a result of the pilot valve 333 opening, the secondary pressure gradually increases.

FIG. 4 is a view of the main stop valve 20 in which current has continued to flow to the coil 310 from the state shown in FIG. 3. In the main valve 300, the return spring force Fs and force generated by the pressure difference at the diameter b of the opening portion 399 (i.e., the difference between the primary pressure and the secondary pressure) are applied as force in the y direction (i.e., the valve closing direction). Also, the attraction force Fr is applied as force in the x direction (i.e., the valve opening direction). Energizing the main stop valve 20 causes the pilot valve 333 in the main stop valve 20 to open, and as the secondary pressure increases as a result, the force generated by the pressure difference at the diameter b of the opening portion 399 gradually decreases, such that the force in the y direction that is applied to the main valve 300 decreases. This decrease in the force in the y direction in this way results in the force in the x direction becoming equal to or greater than the force in the y direction. When the force in the x direction becomes strong enough to be able to raise the main valve valve body 330, the main valve valve body 330 is pushed upward in the x direction, as shown in FIG. 4. As a result, the main valve 300 opens, such that hydrogen gas from inside the hydrogen tank 22 is supplied to the downstream side of the first hydrogen discharge flow path 34 via the opening portion 399.

When current stops flowing to the coil 310 while the main valve 300 is open, the attraction force Fr is eliminated. As a result, the force in the x direction (i.e., the valve opening direction) is eliminated, so the main valve valve body 330 becomes seated on the main valve valve seat 340 and the pilot valve valve body 350 becomes seated on the pilot valve valve seat 360, such that the main stop valve. 20 closes.

C. Control of the Pilot Type Electromagnetic Valve Based on Temperature

When the temperature inside the hydrogen tank 22 decreases due to the hydrogen gas adiabatically expanding in the hydrogen tank 22 when hydrogen is removed from the hydrogen tank 22, the fuel supply system 10 in this example embodiment suppresses this temperature decrease inside the hydrogen tank 22 by changing the control of the main stop valve 20. Hereinafter, the operation relating to this kind of control change of the main stop valve 20 will be described.

Figure 5:
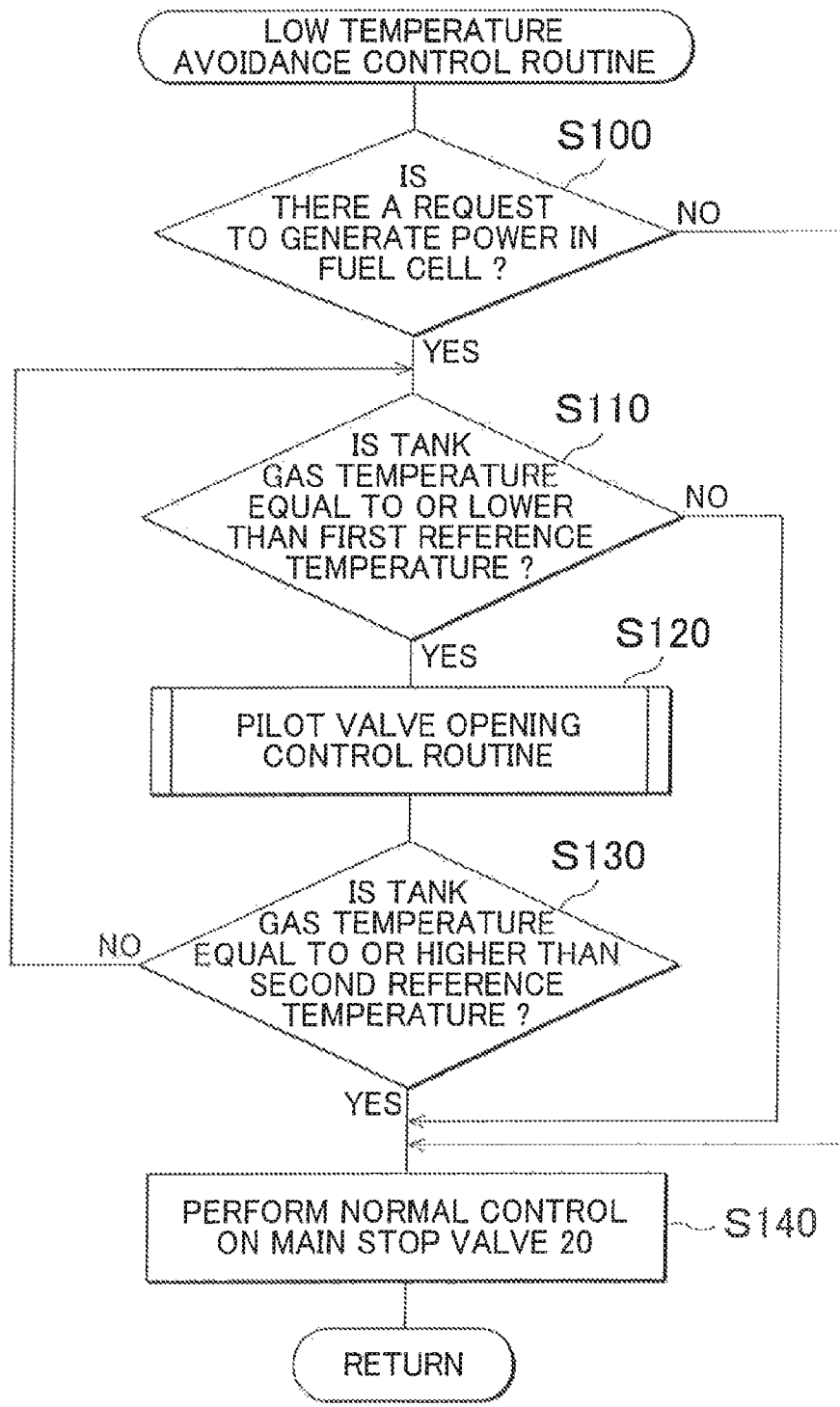
FIG. 5 is a flowchart illustrating a low temperature avoidance control routine.

FIG. 5 is a flowchart illustrating a low temperature avoidance control routine that is executed in the control portion 38 when the fuel cell system that includes the fuel supply system 10 is operating. This routine is starts when the fuel cell system is started, and is repeatedly executed until the fuel cell system is stopped.

When this routine starts, the control portion 38 determines whether there is a request for the fuel cell to generate power (i.e., a fuel cell power generation request), i.e., whether hydrogen gas is being supplied to the fuel cell (step S100). The determination of whether there is a fuel cell power generation request may be made, for example, based on an accelerator operation amount of the electric vehicle provided with the fuel cell system, such that when the accelerator operation amount is a positive value, it is determined that there is a power generation request. Alternatively, the determination of whether there is a power generation request to the fuel cell for the vehicle as a whole may be made when electric power generated by the fuel cell is supplied to vehicle auxiliaries such as an air conditioning system or a lighting system, for example, in addition to being used as energy to drive the vehicle.

If it is determined in step S100 that there is a fuel cell power generation request, the control portion 38 then determines whether the hydrogen gas temperature inside the hydrogen tank 22 is equal to or lower than a first reference temperature (step S110). Here, the first reference temperature is a value set in advance and stored in the control portion 38, as a temperature at which control of the main stop valve 20 should start to be changed so that the hydrogen gas temperature inside the hydrogen tank 22 will not drop any further. The first reference temperature may be set based on a cold resistance temperature of a member arranged downstream of the main stop valve 20. For example, if a seal member of the regulator 25 is made of ethylene-propylene rubber (EPDM), the first reference temperature may be set to −30° C. The hydrogen gas performs heat exchange with the surrounding area and thus rises in temperature farther downstream, so members provided farther downstream in the conduit are less susceptible to the effects of low temperature hydrogen gas. Therefore, the first reference temperature may be set, taking into account the cold resistance temperature of each member provided downstream of the main stop valve 20 and the degree to which each member is affected by the low temperature of the hydrogen gas discharged from the hydrogen tank 22 (e.g., the distance of each member from the main stop valve 20), such that the temperature of each member does not fall below the corresponding cold resistance temperature.

In step S110, a detection signal from the temperature sensor 23 is obtained as a hydrogen gas temperature inside the hydrogen tank 22 and compared with the first reference temperature. When step S110 is executed, hydrogen gas is supplied from the hydrogen tank 22 to the fuel cell because it is determined in step S100 that there is a fuel cell power generation request. When hydrogen gas is removed from the hydrogen tank 22, the hydrogen gas adiabatically expands inside the hydrogen tank 22, so the hydrogen gas temperature inside the hydrogen tank 22 drops. The degree to which the hydrogen gas temperature inside the hydrogen tank 22 drops becomes larger as the amount of hydrogen gas removed from the hydrogen tank 22 increases. Also, if hydrogen continues to be removed, the hydrogen gas temperature inside the hydrogen tank 22 will continue to drop, so the hydrogen gas temperature inside the hydrogen tank 22 may become equal to or lower than the first reference temperature.

If it is determined in step S110 that the hydrogen gas temperature in the hydrogen tank 22 is equal to or lower than the first reference temperature, the control portion 38 executes pilot valve opening control (step S120). This pilot valve opening control is control that opens only the pilot valve 333 while the main valve 300 remains closed in the main stop valve 20, in order to suppress a drop in the temperature of the hydrogen gas discharged from the hydrogen tank 22. The pilot valve opening control routine of step S120 will be described in detail later.

When the pilot valve opening control routine of step S120 starts, the control portion 38 determines whether the tank gas temperature is equal to or higher than a second reference temperature (step S130). This second reference temperature is a value that is set in advance and stored in the control portion 38 as a temperature that is higher than the first reference temperature, and at which it may be determined that it is not necessary to take into account the affect of low temperature on members downstream of the main stop valve 20.

The control portion 38 repeatedly obtains the detection signal from the temperature sensor 23 and compares the obtained tank gas temperature with the second reference temperature, and continues to execute the pilot valve opening control routine started in step S120 until it is determined in step S130 that the tank gas temperature is equal to or higher than the second reference temperature. That is, the pilot valve opening control is continued until the hydrogen gas temperature inside the hydrogen tank 22 rises to equal to or higher than the second reference temperature.

If it is determined in step S130 that the tank gas temperature is equal to or higher than the second reference temperature, the control portion 38 ends the pilot valve opening control routine started in step S120, and changes the valve opening control of the main stop valve 20 to normal control (step S140), after which this routine ends. At this time, the control portion 38 performs control to energize the coil 310 so that the main valve 300 opens in order to supply hydrogen gas from the hydrogen tank 22 to the fuel cell.

If it is determined in step S110 that the hydrogen gas temperature inside the hydrogen tank 22 is higher than the first reference temperature, it is not necessary to take into account the affect from low temperature hydrogen gas being supplied. Therefore, the control portion 38 performs normal control on the main stop valve 20 (step S140), and the routine ends. At this time, the control portion 38 performs control to energize the coil 310 so that the main valve 300 opens.

Also, if it is determined in step S100 that there is no fuel cell power generation request, hydrogen gas is not supplied from the hydrogen tank 22 to the fuel cell. Accordingly, a further drop in temperature in the hydrogen tank due to the discharge of hydrogen gas will not occur. In this case, the control portion 38 performs normal control on the main stop valve 20 (step S140), and then the routine ends. In step S140, the control portion 38 may close the main stop valve 20.

Figure 6:
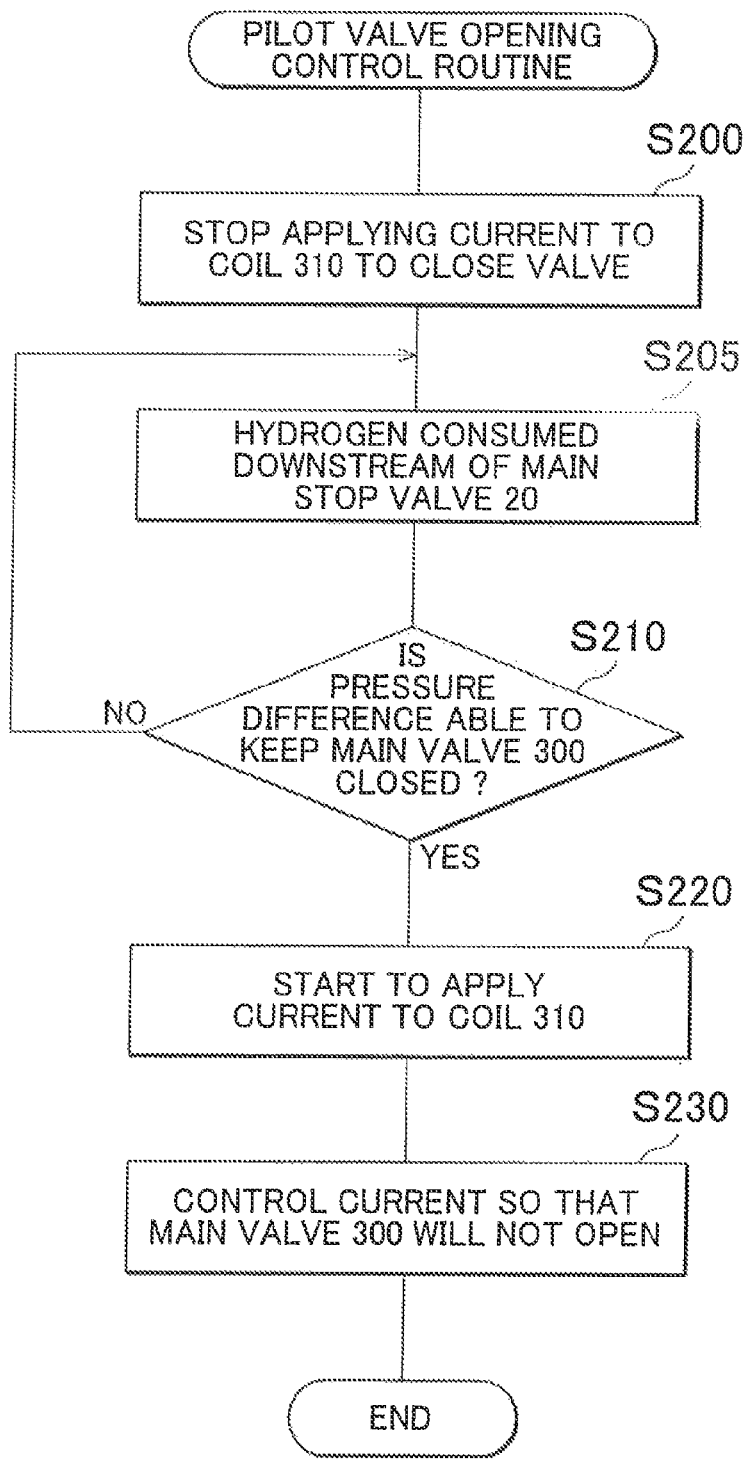
FIG. 6 is a flowchart illustrating a pilot valve opening control routine.

Next, the pilot valve opening control that is executed in step S120 will be described. FIG. 6 is a flowchart illustrating the pilot valve opening control routine. When this routine starts, the control portion 38 stops current from being applied to the coil 310 of the main stop valve 20, thus closing the main stop valve 20 (step S200). That is, when the current to the coil 310 is stopped, the attraction force Fr in the x direction (i.e., the valve opening direction) is consequently eliminated, so the main stop valve 20 closes. When the main stop valve 20 closes, hydrogen stops being discharged from the hydrogen tank 22 to the fuel cell. At this time, because it has been determined in step S100 that there is a fuel cell power generation request, power continues to be generated in the fuel cell. Therefore, even after the main stop valve 20 has closed, hydrogen continues to be consumed in the fuel cell, so the hydrogen gas pressure Pk downstream of the main stop valve 20 gradually decreases.

If in step S200 current stops being applied to the coil 310 such that the main stop valve 20 closes, the control portion 38 then determines whether the differential pressure between the input port pressure (i.e., the primary pressure) and the output port pressure (i.e., the secondary pressure) of the main stop valve 20 is a value at which the main valve 300 can be kept closed (step S210). Hereinafter, operation of this step S210 will be described in detail.

In step S210, the control portion 38 obtains a hydrogen tank internal hydrogen pressure Pm detected by the first pressure sensor 21 as the primary pressure, and obtains a hydrogen pressure Pk of the discharge flow path converging portion 35 detected by the second pressure sensor 27 as the secondary pressure. Then the control portion 38 calculates the differential pressure between the obtained primary pressure and obtained the secondary pressure.

Here, in the main valve 300 of the main stop valve 20, the return spring force Fs and the force generated by the pressure difference at the diameter b of the opening portion 399 (i.e., the difference between the primary pressure and the secondary pressure) are applied as force in the y direction (i.e., the valve closing direction). Of these, the return spring force Fs is constant, but the force generated by the pressure difference at the diameter b of the opening portion 399 gradually increases. That is, immediately after the main stop valve 20 closes in step S200, the primary pressure and the secondary pressure are substantially the same, so the force generated by the differential pressure is small. However, the consumption of hydrogen downstream of the main stop valve 20 (step S205), i.e., the consumption of hydrogen by the fuel cell, causes the secondary pressure to gradually decrease, such that the force in the y direction generated by the differential pressure gradually becomes stronger.

As will be described later, after step S210 the control portion 38 starts to energize (i.e., apply current to) the coil 310 in step S220. Energizing the coil 310 generates the attraction force Fr described with reference to FIG. 3, such that the pilot valve 333 opens. When the pilot valve 333 opens, attraction force Fr that is force in the x direction is consequently also applied to the main valve 300 via the pilot pin 380. A predetermined value is set in advance for the amount of current applied to the coil 310 in step S220 so that an attraction force that is able to open the pilot valve 333 is generated by the coil 310. Therefore, if the force in the y direction in the main valve 300 (i.e., the sum of the return spring force Fs and the force generated by the pressure difference at the diameter b) is greater than the attraction force Fr that is the force in the x direction, the main valve 300 is able to be kept closed even current is flowing to the coil 310.

Therefore, in step S210, it is determined whether the differential pressure between the primary pressure and the secondary pressure is increasing such that the main valve 300 can be kept closed even if the coil 310 starts to be energized in the next step, step S220. This kind of determination is able to be made for example, based on whether the force generated by the pressure difference at the diameter b is greater than the difference between the attraction force Fr and the return spring force Fs (i.e., Fr−Fs). More specifically, the attraction force Fr and the return spring force Fs are preset values, and the only one that fluctuates is the force generated by the pressure difference at the diameter b. Also, the diameter b of the opening portion 399 is a preset value. Accordingly, if the difference between the primary pressure and the secondary pressure is obtained, the force generated by the pressure difference at the diameter b can be set. Also, a minimum value of the difference between the primary pressure and the secondary pressure when the force generated by the pressure difference at the diameter b is greater than (Fr−Fs) can be set. In this example embodiment, a reference pressure difference that is a reference for determining that the force generated by the pressure difference at the diameter b is greater than (Fr−Fs) is set in advance and stored in the control portion 38 as a value equal to or greater than the minimum value of the difference between the primary pressure and the secondary pressure described above.

In step S210, the control portion 38 determines whether the differential pressure calculated based on the obtained primary pressure and the obtained secondary pressure has reached the reference pressure difference. When the differential pressure reaches the reference pressure difference, the control portion 38 determines that the pressure difference is able to keep the main valve 300 closed. The control portion 38 repeatedly executes this process until it is determined that the differential pressure between the primary pressure and the secondary pressure has reached the reference pressure difference. In other words, the control portion 38 repeatedly executes this process until it is determined that the differential pressure between the primary pressure and the secondary pressure following the gradual decrease in the secondary pressure from step S205 has reached the reference pressure difference.

If it is determined in step S210 that the pressure difference is able to keep the main valve 300 closed, then the control portion 38 starts to energize the coil 310 (step S220). In step S220, the coil 310 is energized with a preset amount of current. The amount of current applied to the coil 310 in step S220 may be the same as, or different from, the amount that is applied in order to open the pilot valve 333 when a normal valve opening operation is performed. For example, when a normal valve opening operation is performed, a larger value than the amount of current that is applied in step S220 may be set in order to reduce the response time until the main valve 300 opens and thus improve the responsiveness of the valve opening operation.

When current starts to flow to the coil 310, a predetermined attraction force Fr is generated, such that the pilot valve 333 opens. At this time, the differential pressure between the primary pressure and the secondary pressure is greater than the reference pressure difference, so the main valve 300 is kept closed even if current starts to flow to the coil 310. Because the pilot valve 333 is open, hydrogen gas starts to be supplied via the opening portion 370 of the pilot valve 333. As a result, the secondary pressure Pk that is the pressure on the downstream side of the main stop valve 20 starts to gradually rise.

When current starts to flow to the coil 310 in step S220, the control portion 38 then starts to control the amount of current applied to the coil 310 to a current value that will not cause the main valve 300 to open (step S230). As described above, when the pilot valve 333 is opened as a result of current starting to be applied to the coil 310, force in the y direction (i.e., the sum of the return spring force Fs and the force generated by the pressure difference at the diameter b) and the attraction force Fr that is force in the x direction are applied to the main valve 300. At this time, if the force in the y direction is greater than the force in the x direction, the main valve 300 is able to be kept from opening. Here, of the force in the y direction, the return spring force Fs is a constant value, but the force generated by the pressure difference at the diameter b decreases as the pilot valve 333 opens and the secondary pressure increases. Therefore, in step S230, the attraction force Fr is reduced such that the force in the y direction is kept greater than the force in the x direction, by performing control to reduce the amount of current applied to the coil 310 according to the decrease in the force generated by the pressure difference at the diameter b.

More specifically, in step S230, the control portion 38 calculates the differential pressure between the primary pressure and the secondary pressure based on the detection signals from the first pressure sensor 21 and the second pressure sensor 27, and derives the force generated by the pressure difference at the diameter b of the opening portion 399 based on the calculated differential pressure. For example, a map indicating the relationship between the derived pressure difference and the force generated by the pressure difference at the diameter b of the opening portion 399 may be stored in advance in the control portion 38, and this map may be referenced in step S230. Also, the amount of current applied to the coil 310 may be set so as to generate an attraction force Fr that is smaller than the sum of the force generated by the pressure difference at the diameter b of the opening portion 399 and the return spring force Fs obtained as described above.

The amount of hydrogen consumed by the fuel cell fluctuates according to the amount of power generated in the fuel cell. When the amount of hydrogen consumed by the fuel cell fluctuates, the hydrogen gas pressure (i.e., the secondary pressure) in the hydrogen gas flow path downstream of the main stop valve 20 also fluctuates. Also, when hydrogen gas continues to be removed from the hydrogen tank 22, the hydrogen tank pressure (i.e., the primary pressure) will consequently gradually decrease. Therefore, when supplying hydrogen gas via the opening portion 370 of the pilot valve 333, the differential pressure between the primary pressure and the secondary pressure is able to constantly fluctuate.

When the control in step S230 starts, the control portion 38 in this example embodiment continues the control the amount of current applied to the coil 310 described above until the pilot valve opening control routine ends. That is, the control portion 38 repeatedly executes the operation of calculating the differential pressure between the primary pressure and the secondary pressure, and controlling the amount of current applied to the coil 310 in the main valve 300 so that the force in the y direction can be kept larger than the force in the x direction.

If, after the control of the amount of current applied to the coil 310 has started in step S230, it is determined in step S130 shown in FIG. 5 that the tank gas temperature is equal to or higher than the second reference temperature, the control portion 38 ends this routine. As a result of ending the routine, control of the amount of current applied to the coil 310 that is performed such that only the main valve valve body 330 closes and the main valve 300 opens is stopped, and the control portion 38 starts normal control of the main stop valve 20 (step S140 in FIG. 5).

With the fuel supply system 10 of the example embodiment structured as described above, when supplying hydrogen, control to close the main valve 300 and open only the pilot valve 333 in the main stop valve 20 is performed as the temperature drops in the hydrogen tank 22 due to the hydrogen gas adiabatically expanding in the hydrogen tank 22. Supplying hydrogen gas from only the pilot valve 333 in this way suppresses the amount of hydrogen gas supplied (i.e., the amount of hydrogen gas discharged) and the speed at which the pressure in the hydrogen tank 22 drops. Accordingly, it is possible to inhibit the temperature of the hydrogen gas that is supplied to the members arranged downstream of the main stop valve 20 from becoming too low. As a result, a countermeasure for low temperature hydrogen gas at the members arranged downstream of the main stop valve 20 is no longer unnecessary.

Further, according to the fuel supply system 10 of this example embodiment, when the temperature inside the hydrogen tank 22 has dropped, the flowrate of the low temperature hydrogen gas can be suppressed by supplying hydrogen gas from only the opening portion 370 of the pilot valve 333. When the flowrate is suppressed, the temperature is easily increased by heat exchange with the outside of the gas flow path when hydrogen gas flows to the downstream side, so the affect from low temperature gas on members arranged downstream can be suppressed compared with when hydrogen gas is supplied at a larger flowrate from the opening portion 399 of the main valve 300.

Moreover, according to the fuel supply system 10 of this example embodiment, a drop in the temperature of the hydrogen gas can be suppressed, so material with a higher cold resistance temperature is able to be selected as the material of which a member that is arranged downstream of the main stop valve 20 is made. That is, the requirement related to cold resistance temperature can be eased. Therefore, the degree of freedom in the selection of structural material of the members arranged downstream of the main stop valve 20 can be increased, so costs can be reduced.

Moreover, in the fuel supply system 10 of this example embodiment, control is performed that suppresses the amount of hydrogen gas supplied downstream when the hydrogen gas temperature inside the hydrogen tank 22 has dropped, using the pilot type electromagnetic valve that has been provided near the hydrogen tank 22 as the main stop valve in the past. Therefore, there is no longer a need to provide a separate throttle to suppress the amount of supplied hydrogen gas, which makes it possible to inhibit the system from becoming more complex.

Further, in the fuel supply system 10 in this example embodiment, when the temperature inside the hydrogen tank drops, this drop in the hydrogen gas temperature is suppressed by using only the pilot valve 333. The affect on the operation of supplying hydrogen gas can be suppressed by quickly raising the hydrogen gas temperature in this way. That is, as long as the pressure upstream of the regulator 25 is sufficiently higher than the pressure downstream of the regulator 25, the necessary amount of hydrogen gas, can continue to be supplied without interruption, so the necessary hydrogen gas can continue to be supplied to the fuel cell for a while even though control to reduce the amount of hydrogen gas discharged from the hydrogen tank 22 is performed.

The fuel supply system 10 in this example embodiment includes four hydrogen tanks 22, and hydrogen gas may be taken from all of the hydrogen tanks 22 simultaneously or taken from one hydrogen tank 22 at a time in order. In either case, the effects described above are able to be obtained as long as the hydrogen gas temperature inside the hydrogen tank or tanks from which hydrogen gas is being removed is detected and the control described above is performed for any tanks in which the tank internal hydrogen gas temperature is equal to or lower than the first reference temperature.

D. Modified Examples

The invention is not limited to the example embodiment described above, but may be carried out in any one of various modes without departing from the scope thereof. For example, the modifications described below are possible.

D1. First Modified Example

In the fuel supply system 10 of the example embodiment, the hydrogen gas temperature inside the hydrogen tank 22 drops, so control is performed to adjust the amount of current applied to the coil 310 in order to maintain a state in which the main valve 300 of the main stop valve 20 is closed and only the pilot valve 333 is open, but the structure may also be different. For example, the opening and closing operation of the pilot valve 333 may be repeated such that the main valve 300 of the main stop valve 20 will not open. Hereinafter, control that repeatedly opens and closes the pilot valve 333 in this way will be described.

For example, in the pilot valve opening control routine shown in FIG. 6, control that starts and stops the flow of current to the coil 310 to keep the main valve 300 from opening may be performed instead of the process in step S230. Here, the amount of current applied to the coil 310 may always be a fixed value. Having the amount of current applied to the coil 310 be a fixed value results in the attraction force Fr generated when current is applied to the coil 310 also being a fixed value.

As described above, force in the y direction (i.e., the sum of the return spring force Fs and the force generated by the pressure difference at the diameter b) and the attraction force Fr that is force in the x direction are applied to the main valve 300. Therefore, when current starts to be applied to the coil 310 in step S220 such that only the pilot valve 333 is opened, the force generated by the pressure difference at the diameter b gradually becomes smaller due to the fact that the secondary pressure increases, so the force in the y direction that is applied to the main valve valve body 330 decreases. In this way, when the force generated by the pressure difference at the diameter b becomes small and it is determined that the main valve 300 is able to open, current once again stops being applied to the coil 310 (i.e., the coil 310 is once again de-energized). De-energizing the coil 310 enables the main valve 300 to remain closed, and also enables the pilot valve 333 to be closed. When the pilot valve 333 is closed, consumption of hydrogen by the fuel cell will cause the secondary pressure to once again start to decrease, so the force in the y direction that is applied to the main valve valve body 330 will start to increase. Then if the operations in steps S210 to S220 are performed and a pressure difference that enables only the main valve 300 to be kept open is generated, the coil 310 may be energized and the pilot valve 333 opened.

In this way, a similar effect as that in the example embodiment is able to be obtained if the coil 310 is repeatedly energized and de-energized according to the pressure difference between the primary pressure and the secondary pressure, until it is determined in step S130 that the gas tank pressure has risen sufficiently.

D2. Second Modified Example

In the example embodiment, the main stop valve 20 is formed by a pilot type electromagnetic valve, but the structure may also be different. That is, the pilot valve may also be opened by an actuator other than an electromagnet (such as a piezo element, for example). A similar effect can also be obtained by applying the invention if a pilot type valve that has a pilot valve and a main valve that opens using a change in the pressure difference of fuel gas generated between the inlet portion and the outlet portion of the main stop valve when the pilot valve is open is used.

D3. Third Modified Example

In the example embodiment, the pilot flow path 395 and the pilot valve 333 that opens and closes the pilot flow path 395 are provided inside the main valve valve body 330 of the main valve 300, but the structure may also be different. The pilot valve 333 need only be able to open before the main valve 300 does and reduce the pressure difference between the inlet portion and the outlet portion of the main stop valve 20 (i.e., the pressure difference between the primary pressure and the secondary pressure), so that the main valve. 300 can open with less force. Therefore, the pilot flow path 395 or the pilot valve 333 may also be provided in a location other than inside the main valve valve body 330 or other than inside the main valve 300.

Also, in this example embodiment, the pilot valve 333 is driven open and the main valve 300 is driven open via the pilot valve 333, all by an electromagnet that is a single actuator. However, the structure may also be different. For example, one actuator may be provided for driving the main valve 300 and another actuator may be provided separately for driving the pilot valve 333.

In either case, an actuator that is capable of opening the main valve and the pilot valve at different timings is provided. Normally, a similar effect is able to be obtained if the pilot valve is able to open before the main valve does, and only the pilot valve is able to open when the fuel gas tank temperature is low.

D4. Fourth Modified Example

In the example embodiment, the fuel supply system 10 is used as a constituent element of the fuel cell system to supply hydrogen gas to the fuel cell. However, the structure may also be different. For example, the fuel supply system may also be used to supply hydrogen gas to another type of hydrogen consuming apparatus, such as a hydrogen engine, instead of a fuel cell.

D5. Fifth Modified Example

Also, when removing gas that has been filled at a high pressure into a tank, a phenomenon in which the temperature decreases due to adiabatic expansion may similarly occur in a tank in which gas fuel is stored, even if the gas is a gas other than hydrogen gas. Therefore, the invention may also be applied, with a similar effect obtained, to a supply system for any one of a variety of types of gas fuel, such as methane gas, ethane gas, or compressed natural gas (CNG).

The invention claimed is:

1. A fuel supply system that supplies fuel gas, comprising:
a fuel gas tank in which the fuel gas is stored at high pressure;
a temperature detecting portion that detects a temperature inside the fuel gas tank;
a fuel gas discharge flow path that is connected to the fuel gas tank;
a main stop valve that is provided in the fuel gas discharge flow path; and
a control portion that controls opening and closing of the main stop valve,
wherein the main stop valve includes an inlet portion through which the fuel gas flows in and an outlet portion through which the fuel gas flows out, a main valve that is arranged between the inlet portion and the outlet portion and that opens and closes the fuel gas discharge flow path, a pilot flow path that is provided so as to communicate the inlet portion with the outlet portion, a pilot valve that opens and closes the pilot flow path, and an actuator capable of opening and closing the main valve and the pilot valve at different timings, and
wherein the pilot flow path and the pilot valve are formed inside the main valve, and
wherein the control portion is programmed to open the pilot valve and close the main valve when a detected temperature detected by the temperature detecting portion is equal to or lower than a first reference temperature.

2. The fuel supply system according to claim 1, wherein the control portion is further programmed to repeatedly open and close the pilot valve and closes the main valve when the detected temperature detected by the temperature detecting portion is equal to or lower than the first reference temperature.

3. The fuel supply system according to claim 2, wherein the control portion is further programmed to open the main valve when the detected temperature is equal to or higher than a second reference temperature that is higher than the first reference temperature.

4. The fuel supply system according to claim 1, wherein the pilot valve opens and closes the pilot flow path that is provided inside the main valve.

5. The fuel supply system according to claim 1, wherein the actuator drives the pilot valve, and drives the main valve via the pilot valve.

6. The fuel supply system according to claim 1, wherein the actuator is an electromagnet.

7. The fuel supply system according to claim 1, wherein the reference temperature is a temperature set based on a cold resistance temperature of a member arranged downstream of the main stop valve in the fuel gas discharge flow path.

8. A fuel cell system having a fuel cell, comprising the fuel supply system according to claim 1, wherein the fuel gas is hydrogen gas, and the fuel cell generates electric power using hydrogen gas supplied from the fuel supply system.

9. The fuel supply system according to claim 1, wherein the pilot flow path formed inside the main valve communicates with the outlet portion via an opening portion formed in the main valve.

10. A control method for a fuel supply system that supplies fuel gas, the fuel supply system including a fuel gas tank in which the fuel gas is stored, a fuel gas discharge flow path that is connected to the fuel gas tank, and a main stop valve that is provided in the fuel gas discharge flow path, the main stop valve including an inlet portion through which the fuel gas flows in and an outlet portion through which the fuel gas flows out, a main valve that is arranged between the inlet portion and the outlet portion and that opens and closes the fuel gas discharge flow path, a pilot flow path that is provided so as to communicate the inlet portion with the outlet portion, and a pilot valve that opens and closes the pilot flow path, wherein the pilot flow path and the pilot valve are formed inside the main valve, the control method comprising:
detecting a temperature inside the fuel gas tank; and
opening the pilot valve and closing the main valve when the temperature detected inside the fuel gas tank is equal to or lower than a first reference temperature.

* * * * *